(12) United States Patent
Joyce et al.

(10) Patent No.: US 10,114,666 B1
(45) Date of Patent: Oct. 30, 2018

(54) LOADING SOFTWARE COMPONENTS

(75) Inventors: Scott E. Joyce, Foxborough, MA (US); Anirudh Takkallapally, Natick, MA (US); Munish Desai, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 839 days.

(21) Appl. No.: 12/570,526

(22) Filed: Sep. 30, 2009

(51) Int. Cl.
| | | |
|---|---|---|
| *G06F 9/44* | (2018.01) | |
| *G06F 9/455* | (2018.01) | |
| *H04L 29/08* | (2006.01) | |
| *H04L 29/06* | (2006.01) | |
| *H04L 29/14* | (2006.01) | |

(52) U.S. Cl.
CPC ........ *G06F 9/45558* (2013.01); *H04L 67/141* (2013.01); *H04L 67/28* (2013.01); *H04L 67/42* (2013.01); *H04L 69/40* (2013.01)

(58) Field of Classification Search
CPC ....... G06F 9/4558; H04L 67/42; H04L 67/14; H04L 67/28; H04L 69/40
USPC ........................................................ 717/166
See application file for complete search history.

(56) References Cited

U.S. PATENT DOCUMENTS

| | | | | |
|---|---|---|---|---|
| 6,470,494 B1* | 10/2002 | Chan et al. | .................... | 717/166 |
| 6,718,364 B2* | 4/2004 | Connelly | ................ | G06F 9/445 709/203 |
| 6,801,927 B1* | 10/2004 | Smith | ...................... | H04L 47/10 709/202 |
| 7,200,548 B2* | 4/2007 | Courtney | ............ | H04L 41/0266 717/109 |
| 7,206,934 B2* | 4/2007 | Pabla | ....................... | H04L 63/02 709/226 |
| 7,526,502 B2* | 4/2009 | Hall | ....................... | G06F 9/4491 717/151 |
| 7,647,336 B2* | 1/2010 | Branda | .................... | G06F 9/445 707/999.102 |
| 8,244,775 B1* | 8/2012 | Bak | ........................ | G06F 9/4488 707/802 |
| 8,392,881 B1* | 3/2013 | Lund | ...................... | G06F 9/4488 717/116 |
| 2004/0064568 A1* | 4/2004 | Arora | ....................... | H04L 29/06 709/228 |
| 2005/0038816 A1* | 2/2005 | Easton | ......................... | 707/104.1 |
| 2006/0136401 A1* | 6/2006 | Normington | ..................... | 707/3 |
| 2007/0038989 A1* | 2/2007 | Newton | .............. | G06F 9/44594 717/166 |
| 2007/0198974 A1* | 8/2007 | Branda | .................... | G06F 9/445 717/166 |

(Continued)

OTHER PUBLICATIONS

Forax et al. "A Reflective Implementation of Java Multi-Methods", Dec. 2004, IEEE, vol. 30, No. 12.*

(Continued)

*Primary Examiner* — Wei Zhen
*Assistant Examiner* — Junchun Wu
(74) *Attorney, Agent, or Firm* — Krishnendu Gupta; John T. Hurley (57) ABSTRACT

A method is used in loading software components. A first Java class loader is used to perform a linear search of a first JAR file. Based on the results of the linear search and on an index identifying a second JAR file, a second Java class loader is used to perform a search of the second JAR file.

18 Claims, 7 Drawing Sheets

(56) References Cited

U.S. PATENT DOCUMENTS

2009/0164984 A1* 6/2009 Woods .................... G06F 8/75
717/154
2010/0235821 A1* 9/2010 Baldwin et al. ............. 717/166

OTHER PUBLICATIONS

Zhu et al. "IBM Content Manager OnDemand Web Enablement Kit Java APIs the Basics and Beyond", Dec. 2008, IBM.com/redbooks.*

Bruneton et al. "The FRACTAL component model and its support in Java", Jan. 2006, SP&E.*

* cited by examiner

LOADING SOFTWARE COMPONENTS

BACKGROUND

1. Field of the Invention

The present invention relates to loading software components.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

With respect to ways of handling such management, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object orientated programming language and a platform on which to run the Java applications. Java is both a compiled and an interpreted language. The source code that has been written by the application developer is compiled into an intermediate form called a Java bytecode, which is a platform independent language. At a client machine, the Java bytecodes are interpreted by the Java platform and the Java interpreter parses and runs each Java bytecode instruction on the computer. (If the Java bytecode is run as an applet which is described below, it may first be sent over the network to the client machine.)

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Typical JVM implementations require the ability to load JVM class files, and it is a JVM class loader's role to load referenced JVM classes which have not already been linked to the runtime system. The JVM class loader supports a hierarchy of class loaders, with the system class loader at the root. The JVM class loading mechanism works as follows:

When a class needs to be loaded, the system starts at a node in the hierarchy, that node being the class loader for the current class.

That class loader automatically passes the request (to load a class) upwards towards the root (the system class loader), and this is done in turn by each of the class loaders between the leaf and the root.

When the request arrives at the root, it determines whether the needed class is one that it knows how to load and, if so, it loads an incarnation (implementation) of that class. In fact, the root loads the class if it is configured to do so (in the case of Java, the system class loader uses its system class path and the extensions directory to find classes that it is allowed to load).

If the root cannot load the class, it then indicates this to the class loader that directly passed the request to it by raising a class fault (throwing an exception or returning null are examples of how class faults can be implemented).

That class loader then tries to load the class. If it cannot load the class, then it also indicates this to the class loader that passed the call directly to it. This continues down the hierarchy until either the class gets loaded or an indication of failure (to load the class) reaches the originating class loader. It tries to load the class; and if it fails, then it returns an indication of an error back to the application.

Figure 1:
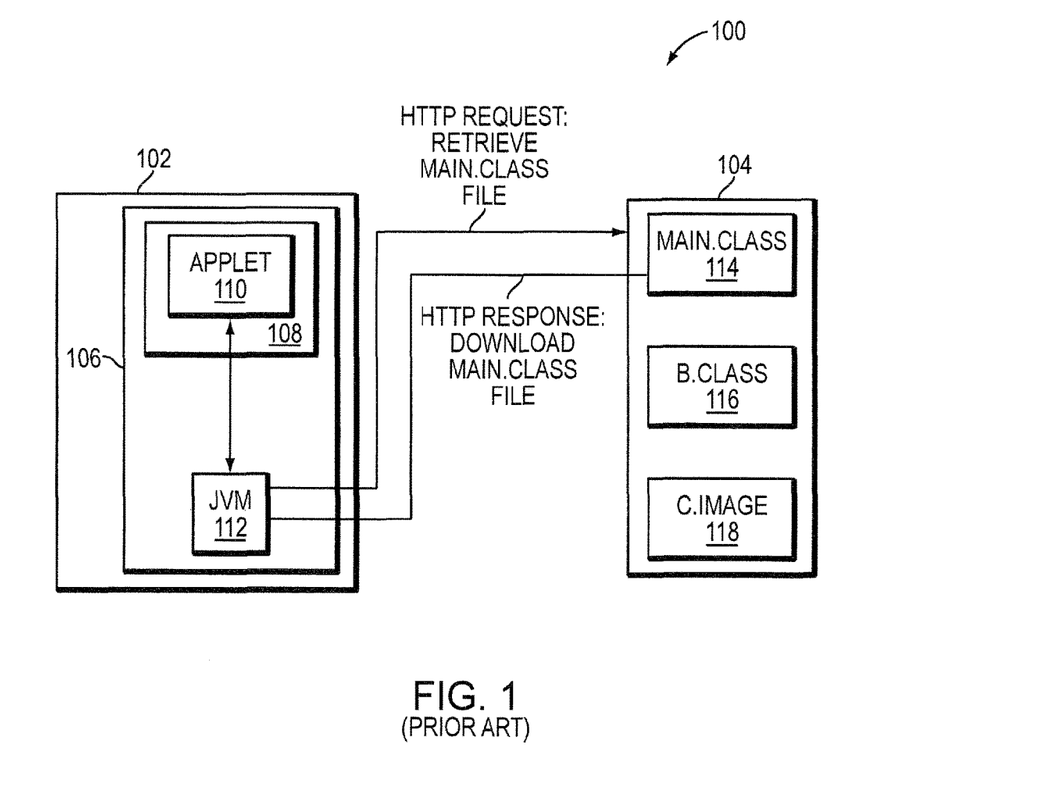
FIGS. 1-2 are illustrations of Java based-systems.

A Java applet is a small program that can be sent along with a Web page to a user that can perform interactive animations, immediate calculations, or other tasks without having to send a user request back to the server. As an example, as shown in FIG. 1, a distributed computer system 100 includes a client computer 102 that is coupled to a server (host) computer 104. The computer 102 includes a browser application 106 that, in turn, includes a requested Web page 108 having an applet 110 embedded therein capable of performing various tasks. In most situations, the applet 110 is executed by a JVM 112 that in this example is also resident in the browser 106.

In order for the JVM 112 to execute the applet 110, the applet's requisite component files (including class files, images and sounds) represented by files 114-118 must be downloaded from the server 104 to the JVM 112. Typically the server 104 is part of a distributed network of computers, such as the Internet, or in some cases could be part of an intranet type of arrangement. In any case, the files 114-118 that are required for the JVM 112 to run the applet 110 include Java class files as well as resource files that are used to support the execution of the applet 110. Such class files, includes a main class file, main.class 114, that is used by the JVM 112 as an entry point for execution of the applet 110. The server 104 also stores other class files such as b.class 116 that are used by the JVM 112 in the furtherance of executing the applet 110. Various image and sound components used in the execution of the applet 110 are stored in resource files such as c.image 118.

In order for the JVM 112 to execute the applet 110, it may be required to download some of the class and resource files as needed. This is typically accomplished by sending a file request that takes the form of an http request to the server 104 which responds by providing an http response that includes the URL of the requested file. By way of example, the JVM 112 issues a request to retrieve the main class file main.class 114 to which the server 104 responds by sending (i.e., downloading) the requested file (i.e., main.class 114). This request/response procedure is followed for every file for which the JVM 112 requires to execute the applet 110.

This arrangement is satisfactory for executing most small applets on small, local networks. However as the complexity of the applet increases (thereby increasing both the size and the number of requested files), the performance of the JVM 112 may be substantially degraded since the time required to satisfy the increasingly voluminous requests for the increasingly larger files in an increasingly more complex network of computers becomes greater.

Figure 2:
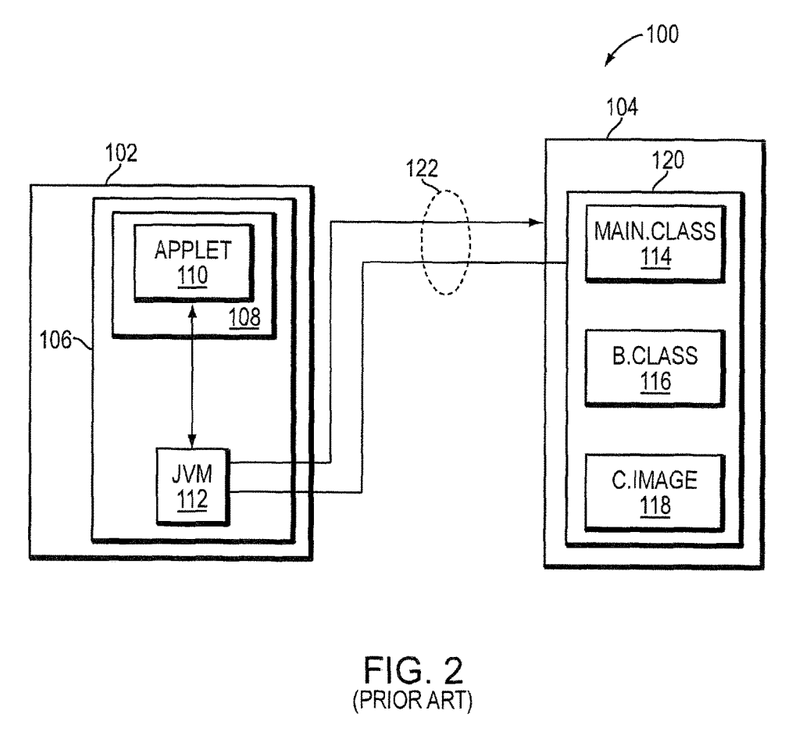

With the introduction of what is referred to as a Java Archive (JAR) file, the performance of network Java applications, such as applets, is somewhat improved. A JAR file has a platform-independent file format that aggregates many files into one. In those applications using JAR files, multiple Java applets and their requisite components (.class files, images and sounds, etc.) can be bundled in a JAR file and subsequently downloaded to a browser in a single HTTP transaction thereby greatly improving the download speed. In addition, the JAR format also supports compression, which reduces the file size, further improving the download time. For example, referring to FIG. 2, the applet component files 114-118 are stored in a single JAR file 120. Using this arrangement, in order for the JVM 112 to execute the applet 110, only a single HTTP file request 122 is required to download the compressed JAR file 120 that contains all the applet component files 114-118.

A Java.net.URLClassLoader ("URLClassLoader") class loader may be used for loading classes and resources that are accessed by searching a set of URLs. The URLs can refer either to directories or to JAR files.

When an applet includes multiple JAR files, a class loader can construct an internal search path of JAR files and whenever it tries to load a class or resource file, it can linearly search each JAR file on its search path in the process downloading and opening each of them. If the class loader tries to find a resource file that does not exist at all, all the JAR files are downloaded, even if most of them are not needed for the applet to run.

JAR indexing may be used to help provide more efficient on-demand downloading of files for an applet in a distributed network environment. In particular, a data structure can be created that maps Java class packages to JAR files, so all the JAR files in the class path do not need to be searched for each needed class. This approach requires pre-processing to create a Java package to JAR file mapping index.

In an example of JAR indexing, a first JAR file, referred to as the root JAR file, is associated with an index file that contains information that relates to the mapping of various packages (or individual class files) and their corresponding JAR files. In order to execute the applet, a class loader associated with the Java virtual machine queries the root JAR file and determines whether or not a corresponding index file is present. If an index file is present, the class loader creates a HASH table that is based upon the contents of the index file. Typically, the HASH table index provides a mapping of all packages and all corresponding JAR files required to execute the applet by the JVM. During runtime, when a particular file is required by the JVM, the class loader queries the HASH table in order to directly access the appropriate JAR file to be downloaded. In this way, the need to perform a linear search of all JAR files and component files contained therein is substantially avoided.

SUMMARY OF THE INVENTION

A method is used in loading software components. A first Java class loader is used to perform a linear search of a first JAR file. Based on the results of the linear search and on an index identifying a second JAR file, a second Java class loader is used to perform a search of the second JAR file.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in loading software components. In accordance with the technique, specialized loading of JAR files can be provided. In at least one implementation also described below, use of the technique helps provide a solution utilizing two means of JAR file loading to achieve a fast loading dynamic plug-in architecture: dynamic class loading and JAR indexing. In particular, in the solution, a procedure is provided by which it is automatically arranged that dynamic class loading is used for non-indexed JAR files, and JAR indexing is used for indexed JAR files.

Two common reasons for utilizing JAR files are to (1) group together a number files by appropriate criteria and (2) easily transport a group of files from one place to another. In a Java environment, JAR files contain executable code files and other relevant files such as image files. The Java environment has the capability to examine the contents of the JAR files and find the code to execute.

In an example implementation, an application that utilizes the technique includes several JAR files. In addition, in one deployment option, the JAR files are located on a storage system, e.g., an EMC CLARiiON storage system. These JAR files are downloaded ("pulled") from the storage system and onto a workstation so that the JAR files may be executed (to run the application) on the workstation. The technique helps provide a flexible way (by taking advantage of the Java environment) of downloading the JAR files so that the application loads and runs quickly.

The Java SDK URLClassLoader mechanism allows for dynamically including JAR files and classes into the system at runtime. This mechanism is powerful but can have a download performance issue (potential slow loading) since it uses a default Java procedure for finding classes. In the default procedure, JAR files are pulled and searched until a desired class is found. It is possible that the desired class for loading is contained within the last JAR file pulled.

JAR indexing can be utilized to help solve this potential slow loading. JAR indexing is a common way to speed up the startup of an application, applet, or web start application. In JAR indexing, an INDEX.LIST file is generated in a JAR file that is provided to the application at startup. The INDEX.LIST contains a list of all the other JAR files and packages within those JAR files. The JVM uses the INDEX.LIST to download JAR files as instances of classes are created. This can increase performance since a JAR file need not be pulled until it is needed based on the package names.

A characteristic of JAR indexing is that all of the JAR files and the packages within those JAR files must be known upfront, i.e., in advance of any execution that relies on those JAR files, which can be in conflict with a plug-in architecture, e.g., having add-on JAR files, for the application.

At least one implementation of the technique described herein uses both dynamic class loading and JAR indexing in order to obtain a fast loading dynamic architecture.

In at least some cases, the following principles are used with the technique. All developers are required to utilize dynamic class loading and define required JAR files in service definition XML files for each plug-in, so that JAR indexing is optional. At runtime it is determined whether JAR indexing is enabled, and if so, indexed JAR files are excluded from a dynamic loading list since the JVM automatically handles indexed JAR files, with the increase in performance. Developer builds of the application do not use JAR indexing and rely on dynamic class loading. Release builds of the application rely on indexing of the JAR files so that customers benefit from the performance increase.

One or more of the following advantages may be gained in connection with use of the technique. High performance may be provided for core application JAR files (e.g., all predefined plug-ins) while retaining the ability to drop in new features and plug-ins including add-on JAR files after indexing. Internationalization may be gained such that JAR files supporting additional languages can be dropped in after an initial installation and the system automatically adds such JAR files to a JAR file search path. OEM support may be gained such that an OEM customer (or someone else) can drop custom resource JAR files into an existing system, e.g., to modify system look and feel, strings, and icons.

In at least one implementation, use of the technique never requires an original classpath (list of JAR files) to change. JAR files are listed from the command line (when running as an application) or the archive tag (when running as an applet), and this list does not change. The rest of the list is gathered via the JAR indexing or service definition XML files.

Figure 3:
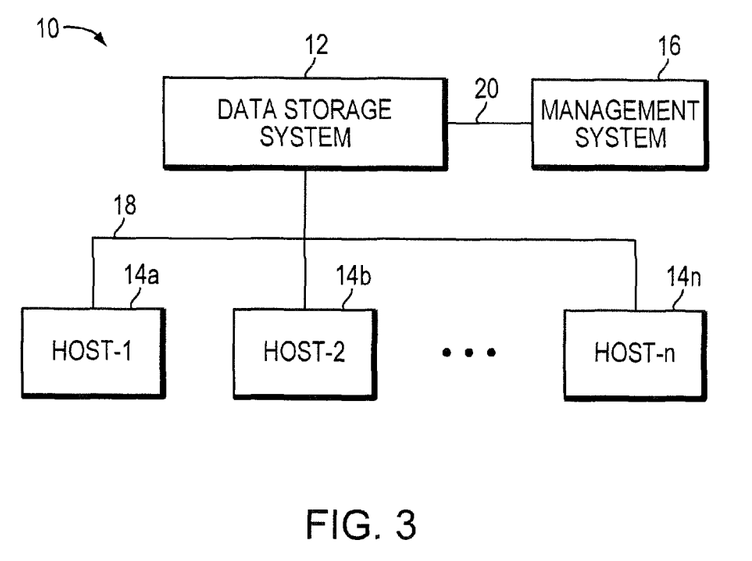
FIGS. 3-5 are illustrations of systems that may be used with the technique herein.

Referring now to FIG. 3, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment. Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Components of the management system 16 may include a graphical user interface (GUI) application which includes a Java applet making network calls to a management interface in data storage systems 12, may be used in connection with interfacing with a user, such as a data storage system manager. The GUI may be used to obtain input in connection with inquiries to be made regarding one or more of systems 12. The GUI may also be used in connection with displaying output, for example, in response to obtaining information for requested inquiries regarding the one or more of systems 12. The GUI may be used in connection with one or more applications for performing system management of one or more of systems 12.

Figure 4:
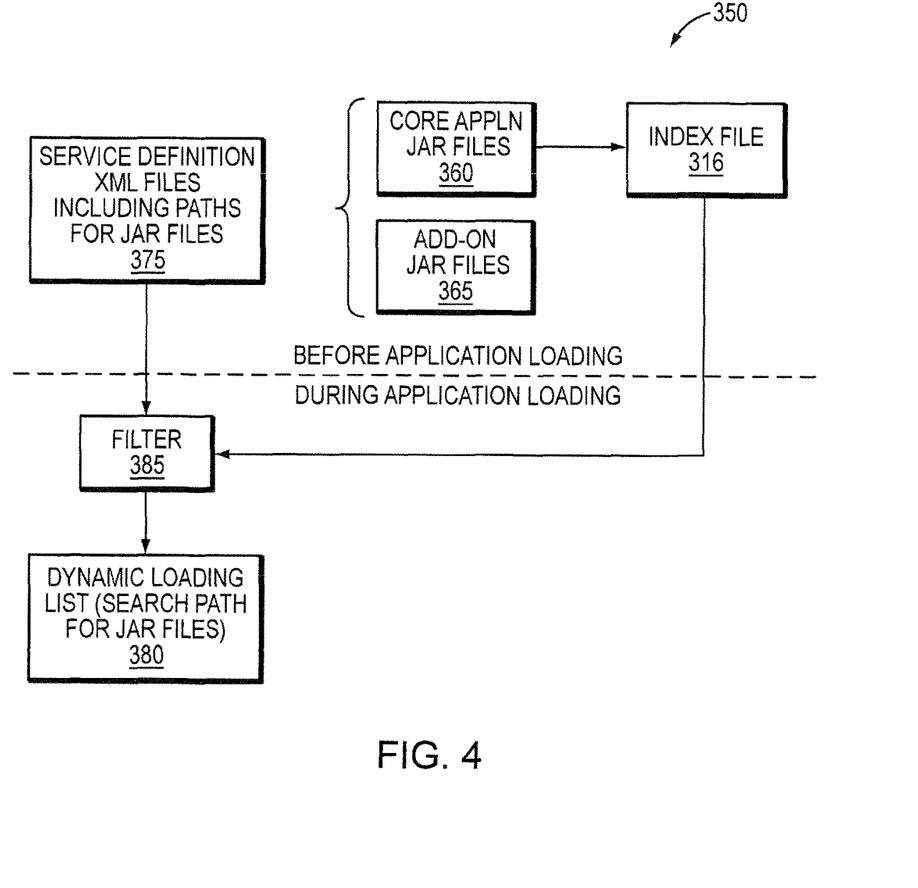

FIG. 4 illustrates aspects of at least one implementation of the technique with respect to actions that take place before and during loading of the GUI application. In general, a startup process is as follows:
1. Load service definition XML files.
2. Dynamically configure a classpath (a list of JAR files) based on the XML files.
   a. Generate list of "source" JAR files that are not indexed and add them to a dynamic loading list for use by a special class loader.
   b. Generate list of "resource" JAR files that are not indexed and add them to the dynamic loading list.
   c. Generate list of possible OEM JAR files and add them to the dynamic loading list.
   d. Generate a list of additional language JAR files based on the selected language.

In at least one implementation source and resource content are separated because internationalization is applied only to resource content.

With reference to FIG. 4, before loading of the GUI application, an index file 316 (INDEX.LIST as described above) is derived from core JAR files 360 of the GUI application, and service definition XML files 375 are derived from file 360 and from add-on JAR files 365 corresponding to plug-in features. Files 375 identify, and provide path information for, JAR files used by the GUI application (e.g., all such JAR files).

During loading of the GUI application, filter logic 385 derives a dynamic loading list 380 from files 375 and index file 316. In particular, logic 385 causes list 380 to include pointers (e.g., URLs) only to JAR files identified in files 375 that are not included in index file 316. As described below, JAR files that are represented in index file 316 need not be included in list 380 because such JAR files are found automatically by JVM class loading.

In at least one implementation, as long as files 375 are stored in an expected location (e.g., a predetermined directory or folder), files 375 are automatically found upon loading of the application so that the GUI application can be supplemented with new plug-in or add-on functionality simply by supplying some files 375 and corresponding JAR files.

Figure 5:
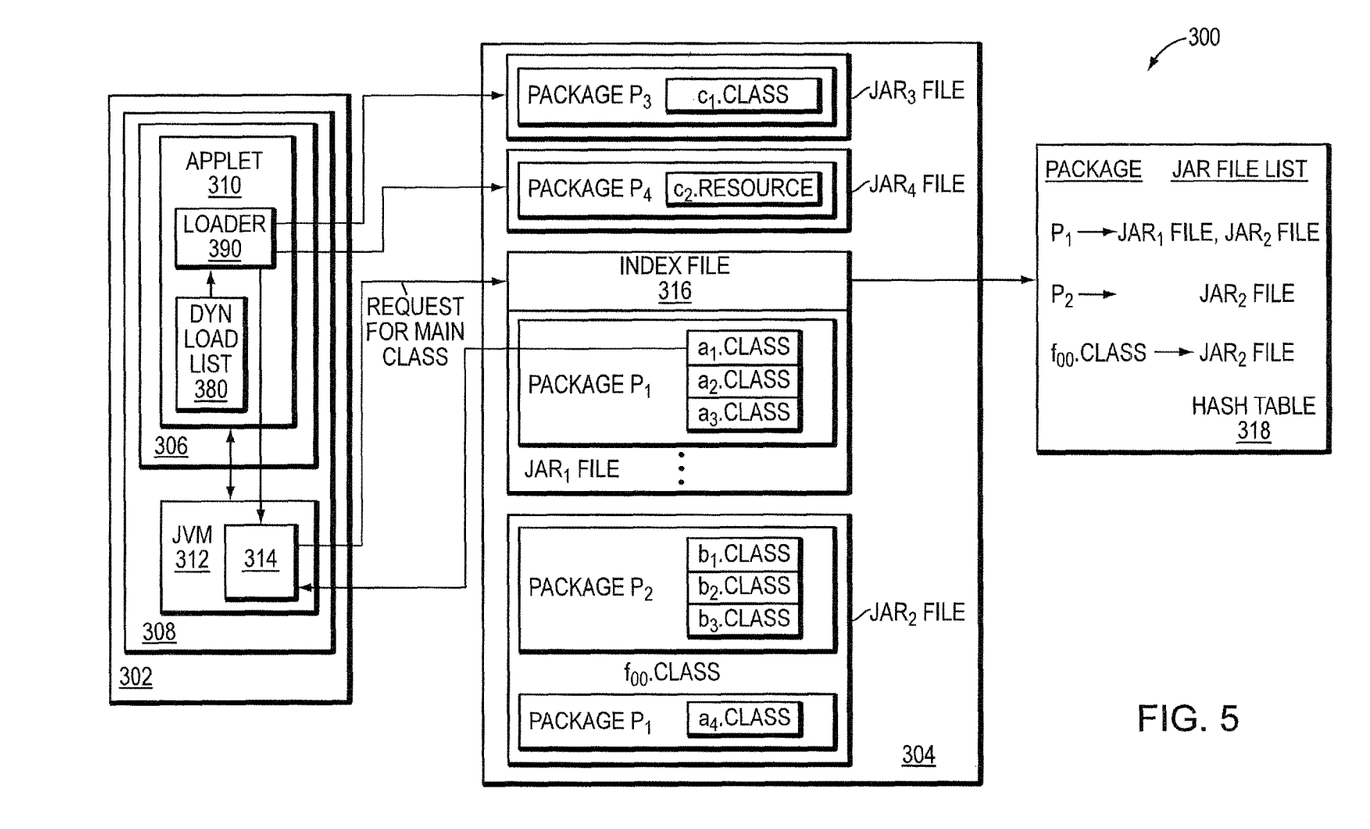

FIG. 5 illustrates aspects of at least one implementation of the technique with respect to actions that take place during runtime of the GUI application. In particular, such aspects will now be described in terms of a Java Virtual Machine embedded within, or coupled to, a Java based browser resident in a client computer that is typically used to execute a applet. The applet, in turn, has a number of associated component files, such as class and image files, stored in, or coupled to, a data storage system that is connected to the client computer. It should be noted, however, that the technique can be implemented in any system where providing resource efficient on-demand download and execution of files used to, for example, run embedded, or other type, applications is important.

Referring now to FIG. 5, a Java based system 300 in accordance with the technique is shown. The system 300 includes a client computer 302 coupled to a data storage system 304. Typically, system 304 is part of a distributed interconnected computer network (not shown) such as a local area network, sometimes referred to as an intranet, but can also be part of the Internet. In order to facilitate communication between the various users and/or computers that form the network, the client computer 302 utilizes the graphical user interfaces presented by a Web page 306 resident in a Java based browser 308 (sometimes referred to as an http page). Most browsers are formed of various HTTP statements. In some cases, an applet 310 is formed by selectively embedding certain HTTP statements within the HTTP framework of the web page 306. By embedding various applets within the browser, the browser user can independently run various applications from a single browser thereby facilitating various interactive events between the browser user and the computer network.

In the described embodiment, a Java Virtual Machine (JVM) 312 helps execute the applet 310 in the described embodiment by instantiating a JVM class loader 314. The class loader 314, along with another class loader 390 described below, has the responsibility to retrieve files as directed by the JVM 312 in the execution of the applet 310. (As described herein, loader 390 may be a custom URL-ClassLoader that loads a list of JAR files from service definition XML files.) In order to execute the applet 310, however, various component files stored in the system 304 must be identified by JVM 312, retrieved by the class loaders 314, 390 and ultimately downloaded to the JVM 312 for execution. In the embodiment shown in FIG. 5, the component files corresponding to the applet are stored in various JAR files. It should be noted that in order to properly execute the applet 310, Java class files as well as resource files, such as image and/or sound files may be required. In a preferred embodiment, the various related component files are grouped into what is referred to as packages. By way of example, a package $P_1$ contains various class files, file $a_1$.class, file $a_2$.class, and file $a_3$.class, such that the file $a_1$.class (commonly referred to as a main class file) provides an entry point for the JVM 312 to start executing the applet 310. Typically, the main class is the first application class loaded by the JVM 312 which when executed by the JVM 312 will invoke additional class loading.

Continuing the description of the system 300 of FIG. 5, a package $P_2$ stored in JAR file $JAR_2$ includes various additional class files, file $b_1$.class, file $b_2$.class, and file $b_3$.class, used in one form or another in the execution of the applet 310. Also, a plug-in related package $P_3$ stored in JAR file $JAR_3$ includes at least one additional class file $c_1$.class, used in one form or another in the execution of the applet 310, and another plug-in package $P_4$ stored in JAR file $JAR_4$ includes at least one additional resource file, file $c_2$.resource, used in one form or another in the execution of the applet 310.

In some cases, a single class file, such as $f_{00}$.class, may not be associated with any particular package. By way of example, the file $f_{00}$.class is not associated with any particular package but is also stored in JAR file $JAR_2$.

It is also significant to note that in some cases a package can be stored in more than one JAR file such that a particular package can be associated with a list of JAR files. Such a situation is shown in FIG. 5 with respect to package $P_1$ being stored in both JAR file $JAR_1$ and JAR file $JAR_2$.

When the JVM 312 begins to execute the applet 310, the class loader 314 associated with the JVM 312 loads the root JAR file, which in this example, is JAR file $JAR_1$. The class loader 314 will then determine whether an index file 316 that maps packages to corresponding JAR files is included in the root JAR file $JAR_1$. If there exists such an index file, the class loader 314 uses information contained in the index file 316 to create a HASH table 318. In a preferred embodiment, the HASH table 318 provides a mapping between at least some packages associated with the applet 310 and the corresponding JAR files in which those packages can be found. Once the HASH table 318 has been created, the class loader 314 then reads the HASH table 318 to ascertain the JAR file in which the main class file is located ($JAR_1$).

Once the main class file has been located, the class loader 314 directly downloads the appropriate JAR file as indicated by the HASH table 318 and accesses the desired main class file which is then loaded to the JVM 312. Once the JVM 312 has retrieved the downloaded main class file, the JVM 312 begins execution of the applet 310.

While the JVM 312 is executing the applet 310, class loaders 314, 390 are used to determine the location of class and/or resource files as requested by the JVM 312 in order to continue executing the applet 310. In particular with respect to such determination, as described below, class loader 390 performs linear searches using dynamic loading list 380 and, if necessary, class loader 314 continues to query the HASH table index 318. In this way, the ability to perform linear searching of the class and resource files stored within the various JAR files stored in data storage system 304 is still fully available where needed. Eventually, execution of the applet 310 ceases. It should be noted that the JVM 312 can execute multiple applets.

Figure 6A:
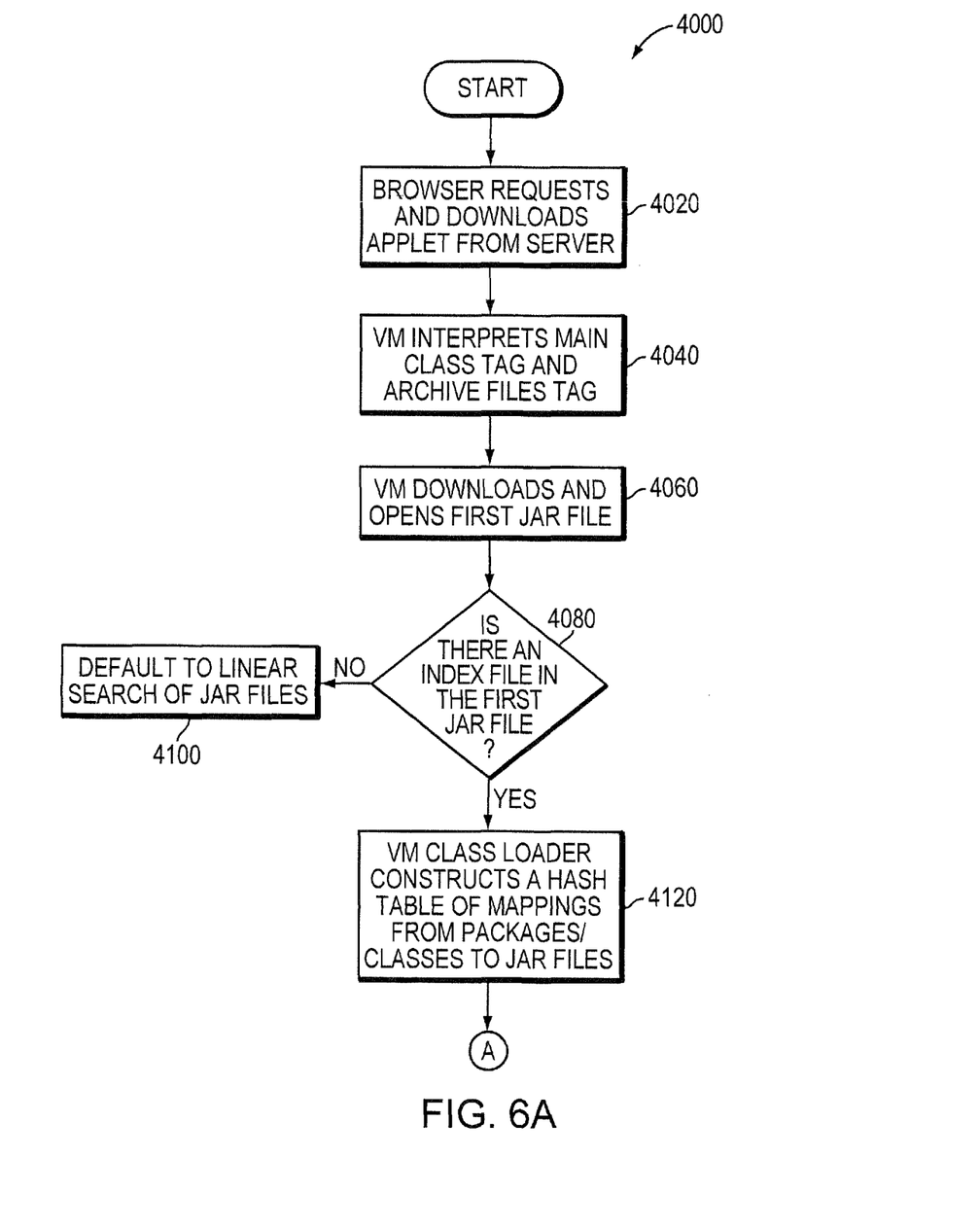
FIGS. 6A-6B are illustrations of at least one procedure that may be used with the technique herein.
Figure 6B:
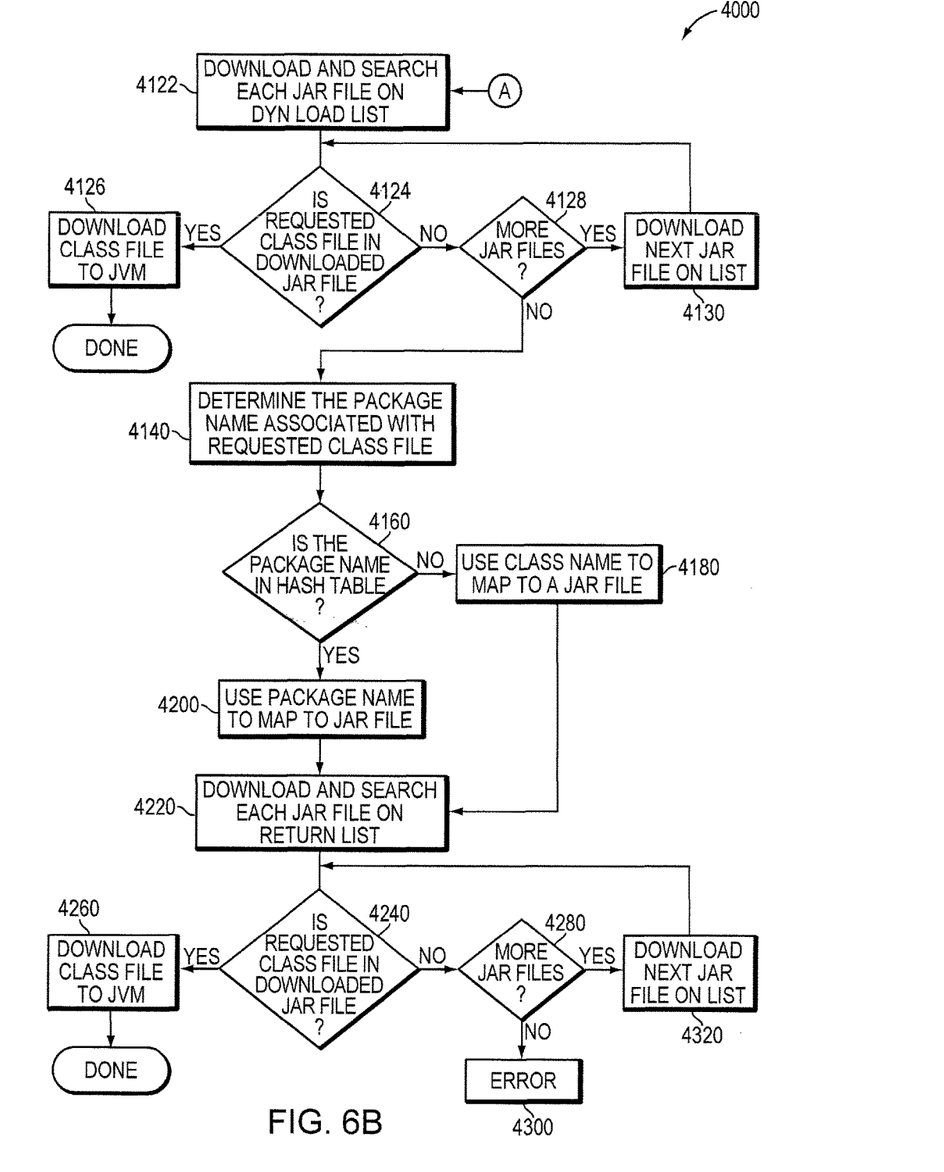

FIGS. 6A and 6B illustrate a flowchart detailing a process 4000 for downloading and executing files in a distributed network environment in accordance with at least one implementation of the technique. The process 4000 begins in FIG. 4a at 4020 by the browser resident on a client computer requesting and downloading an applet from a data storage system. A JVM resident on the client computer interprets the main class tags and archive file tags corresponding to the downloaded applet at 4040. The main class tags and archive file tags provide the JVM with file identifiers subsequently used to identify the various applet component files stored in memory devices coupled to the data storage system. At 4060, using the main class tags, the JVM downloads and opens the root JAR file which may contain the main class files associated with the applet. A determination is then made at 4080 whether or not an index file is associated with the root JAR file. If it is determined that there is no associated index file, a default linear search of all JAR files is performed at 4100. Otherwise, the class loader 314 in the JVM constructs a HASH table based upon the index file that maps all packages and/or class files not in packages to their respective JAR files at 4120.

As described above, even if the associated index file is provided, the GUI application may include some JAR files that are not indexed, particularly if there are JAR files provided by an OEM or customer. These non-indexed JAR files are identified in list 380.

Turning to FIG. 6B, loader 390 uses the linear search algorithm to search the JAR files identified in list 380, which JAR files are downloaded one by one and searched for the requested class file at 4122. If it is determined that the downloaded JAR file contains the requested file at 4124, the requested class file is retrieved and loaded into the JVM at 4126. If, however, the requested file is not in the downloaded JAR file, a determination is made at 4128 whether or not there are additional JAR files on list 380. If there are no additional JAR files, control is passed to 4140 which executes as described below. On the other hand, if there are additional JAR files on list 380, the next JAR file on list 380 is downloaded at 4130 and control is passed to 4124 to determine whether or not the requested file is present in the next downloaded JAR file.

Loader 314 makes a determination at 4140 of the package name associated with a requested class file. If, at 4160, it is determined that the package name associated with the requested file is not in the HASH table, the requested file name itself is used to query the HASH table at 4180. This particular situation arises when, for example, a single class file is not related to any other class files and is therefore not associated with a particular package. This case is illustrated in FIG. 5 by the $f_{00}$.class file being stored in the JAR file $JAR_2$.

If, however, the package name is found to be included in the HASH table at 4160, the package name is mapped to the associate JAR file(s) using the HASH table at 4200. It should be noted that there can be any number of JAR files corresponding to a particular package name and that a particular JAR file can be associated with more than one package name. These cases are aptly illustrated and duly noted in FIG. 5. Once the appropriate JAR file(s) have been identified, the linear search algorithm is used to search the JAR files on the return list which are downloaded one by one and searched for the requested class file at 4220. (It should be noted that in some cases the return list could be empty indicating an error.) In one embodiment, once the appropriate JAR files are identified on the return list, the first JAR file is downloaded and searched.

If it is determined that the downloaded JAR file contains the requested file at 4240, the requested class file is retrieved and loaded into the JVM at 4260. If, however, the requested file is not in the downloaded JAR file, a determination is made at 4280 whether or not there are additional JAR files on the return list. If there are no additional JAR files, an error has occurred and an error flag is thrown at 4300. On the other hand, if there are additional JAR files on the return list, the next JAR file on the return list is downloaded at 4320 and control is passed to 4240 to determine whether or not the requested file is present in the next downloaded JAR file.

An alternative implementation may cause index file 316 to refer not only to core JAR files 360 but also to one or more JAR files that may be added later with predetermined file names, e.g., language-related JAR files that will be provided under known file names. Accordingly, such JAR files need not be included in list 380 for the linear search by loader 390.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed by a processor for use in loading a plurality of Java components in connection with executing a first program, the plurality of Java components corresponding to one or more JAR files, the method comprising:

receiving an index of indexed Java components that is at least a subset of the plurality of Java components, the index associating each of the indexed Java components with a respective one of the plurality of JAR files;

generating from the index a hash table that maps each indexed Java component to a respective one of the plurality of JAR files;

generating from the index a dynamic loading list of non-indexed Java components that are not included in the index;

loading the non-indexed Java components using the dynamic loading list; and loading the indexed Java components using the hash table.

2. The method of claim 1, wherein the act of loading the non-indexed Java components includes using a first Java class loader, and wherein the act of loading the indexed Java components is performed using a second Java class loader.

3. The method of claim 1, further comprising:
determining whether JAR indexing is enabled; and
based on the determination, excluding indexed JAR files from the dynamic loading list.

4. The method of claim 1, further comprising:
loading service definition XML files; and
dynamically configuring a classpath based on the XML files.

5. The method of claim 1, further comprising:
loading service definition XML files;
generating a list of JAR files that are not indexed; and
adding the JAR files to the dynamic loading list for use by a special class loader.

6. The method of claim 1, further comprising:
deriving an index file from core JAR files of a GUI application; and
deriving service definition XML files from add-on JAR files corresponding to plug-in features, wherein the service definition XML files identify, and provide path information for, JAR files used by the GUI application.

7. The method of claim 1, further comprising:
causing the dynamic loading list to include pointers to JAR files identified in service definition XML files that are not included in an index file, wherein the service definition XML files identify, and provide path information for, JAR files used by a GUI application.

8. The method of claim 1, further comprising:
based on whether service definition XML files are stored in an expected location, automatically loading the service definition XML files upon loading of the application so that a GUI application can be supplemented with new plug-in functionality by supplying the service definition XML files and corresponding JAR files.

9. The method of claim 1, wherein the first program is an applet, the method further comprising:
while a JVM is executing the applet, using first and second class loaders to determine the location of class and resource files as requested by the JVM in order to continue executing the applet, wherein the first class loader performs linear searches using the dynamic loading list and the second class loader queries the HASH table.

10. A system for use in loading a plurality of Java software components in connection with executing a first program, the plurality of Java components corresponding to one or more JAR files, the system comprising a processor configured with logic to:

receive an index of indexed Java components that is at least a subset of the plurality of Java components, the index associating each of the indexed Java components with a respective one of the plurality of JAR files;
generate from the index a hash table that maps each indexed Java component to a respective one of the plurality of JAR files;
generate from the index a dynamic loading list of the non-indexed Java components based at least in part on an index of the indexed Java components;
load the non-indexed Java components using the dynamic loading list; and
load the indexed Java components using the hash table.

11. The system of claim 10, further comprising:
a first Java class loader to load the non-indexed Java components includes, and
a second Java class loader to load the indexed Java components.

12. The system of claim 10, wherein the processor is further configured with logic to:
determine whether JAR indexing is enabled; and
exclude, based on the determination, indexed JAR files from the dynamic loading list.

13. The system of claim 10, wherein the processor is further configured with logic to:
load service definition XML files; and
dynamically configure a classpath based on the XML files.

14. The system of claim 10, wherein the processor is further configured with logic to:
load service definition XML files;
generate a list of JAR files that are not indexed; and
add the JAR files to the dynamic loading list for use by a special class loader.

15. The system of claim 10, wherein the processor is further configured with logic to:
derive an index file from core JAR files of a GUI application; and
derive service definition XML files from add-on JAR files corresponding to plug-in features, wherein the service definition XML files identify, and provide path information for, JAR files used by the GUI application.

16. The system of claim 10, wherein the processor is further configured with logic to:
cause the dynamic loading list to include pointers to JAR files identified in service definition XML files that are not included in an index file, wherein the service definition XML files identify, and provide path information for, JAR files used by a GUI application.

17. The system of claim 10, wherein the processor is further configured with logic to:
automatically load, based on whether service definition XML files are stored in an expected location, the service definition XML files upon loading of the application so that a GUI application can be supplemented with new plug-in functionality by supplying the service definition XML files and corresponding JAR files.

18. The system of claim 10, wherein the first program is an applet, and wherein the processor is further configured with logic to:
use, while a JVM is executing the applet, first and second class loaders to determine the location of class and resource files as requested by the JVM in order to continue executing the applet, wherein the first class loader performs linear searches using the dynamic loading list and the second class loader queries the HASH table.

* * * * *